United States Patent
Khailany et al.

(10) Patent No.: US 7,669,041 B2
(45) Date of Patent: Feb. 23, 2010

(54) INSTRUCTION-PARALLEL PROCESSOR WITH ZERO-PERFORMANCE-OVERHEAD OPERAND COPY

(75) Inventors: Brucek Khailany, San Francisco, CA (US); Ujval J. Kapasi, San Jose, CA (US)

(73) Assignee: Stream Processors, Inc., Sunnyvale, CA (US)

( * ) Notice: Subject to any disclaimer, the term of this patent is extended or adjusted under 35 U.S.C. 154(b) by 434 days.

(21) Appl. No.: 11/742,514

(22) Filed: Apr. 30, 2007

(65) Prior Publication Data

US 2008/0270750 A1 Oct. 30, 2008

Related U.S. Application Data

(60) Provisional application No. 60/849,945, filed on Oct. 6, 2006.

(51) Int. Cl.
*G06F 9/312* (2006.01)
(52) U.S. Cl. .......................................... 712/225; 712/24
(58) Field of Classification Search ............... 712/11, 712/24, 225
See application file for complete search history.

(56) References Cited

U.S. PATENT DOCUMENTS

| 5,303,354 | A | 4/1994 | Higuchi et al. |
|---|---|---|---|
| 5,590,365 | A | 12/1996 | Ide et al. |
| 6,192,384 | B1 | 2/2001 | Dally et al. |
| 6,269,435 | B1 | 7/2001 | Dally et al. |
| 7,032,102 | B2 * | 4/2006 | Leijten et al. ............... 712/225 |
| 7,047,391 | B2 | 5/2006 | Dally et al. |
| 7,287,151 | B2 * | 10/2007 | Bekooij et al. ............. 712/225 |
| 2002/0023201 | A1 * | 2/2002 | Saulsbury et al. .......... 712/225 |
| 2004/0117597 | A1 * | 6/2004 | Kailas ........................ 712/24 |

OTHER PUBLICATIONS

Bekooij et al., "Phase Coupled Operation Assignment for Vliw Processors with Distributed Register Files", Proceedings of the 14th International Symposium on Systems Synthesis, IEEE, Oct. 1-3, 2001, pp. 118-123.*
Kumar et al., "Interconnections in Multi-Core Architectures: Understanding Mechanisms, Overheads and Scaling", Proceedings of the 32nd International Symposium on Computer Architecture, IEEE, Jun. 4-8, 2005, pp. 408-419.*
Saluja et al., "Performance Analysis of Inter Cluster Communication Methods in VLIW Architecture", Proceedings of the 17th International Conference on VLSI Design, IEEE, 2004, pp. 761-764.*

(Continued)

*Primary Examiner*—William M Treat
(74) *Attorney, Agent, or Firm*—Mahamedi Paradice Kreisman LLP

(57) ABSTRACT

A processor having a zero-overhead operand copy capability. The processor includes multiple execution units to execute instructions in parallel and multiple register files each associated with one or more of the execution units. The processor further includes circuitry to select either an instruction execution result from a first one of the execution units or content of a register within a first one of the register files associated with the first one of the execution units to be stored within a register within a second one of the register files.

20 Claims, 3 Drawing Sheets

OTHER PUBLICATIONS

International Preliminary Report on Patentability of Apr. 9, 2009 in International Application PCT/US2007/080651 7 pages.

Hoogerbrugge, et al, "Register File Port Requirements of Transport Triggered Architecture", 1994, pp. 191-195, IEEE, San Jose, CA, USA.

International Search Report and Written Opinion of the International Searching Authority for International Application PCT/US2007/080651, European Patent Office, Jan. 31, 2007, 12 pages.

Terechko A., et al, "Inter-cluster Communication Models for Clustered VLIW Processors", 2003, 11 pgs, ACM, San Jose, CA, USA.

* cited by examiner

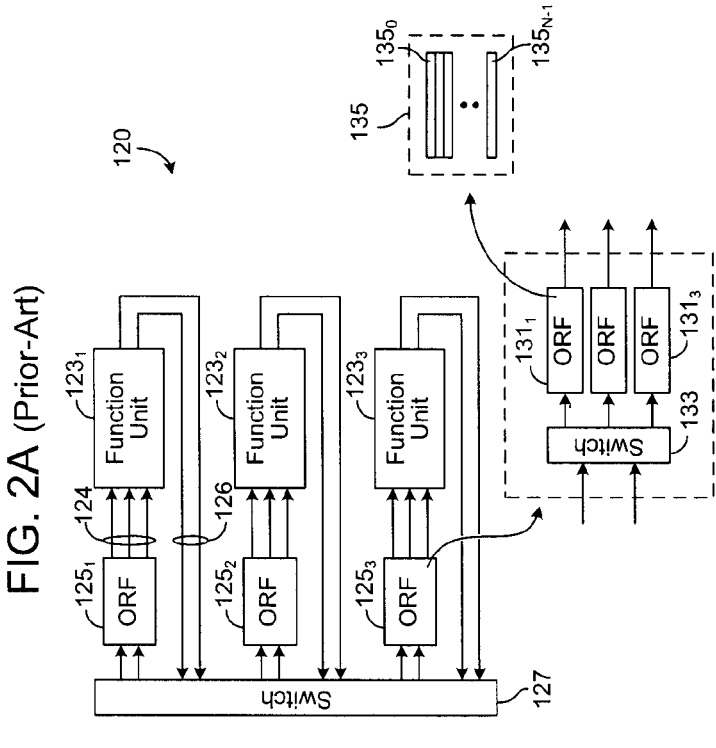
FIG. 2A (Prior-Art)
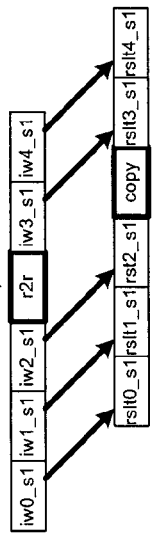
FIG. 2B (Prior-Art)
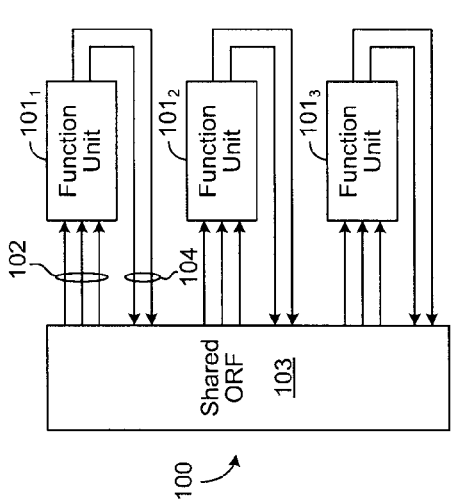
FIG. 1A (Prior-Art)
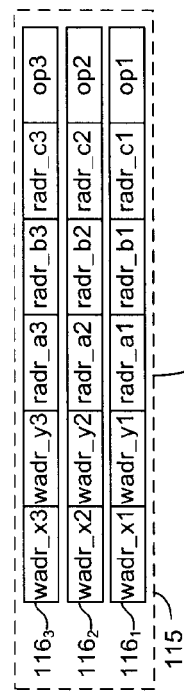
FIG. 1B (Prior-Art)

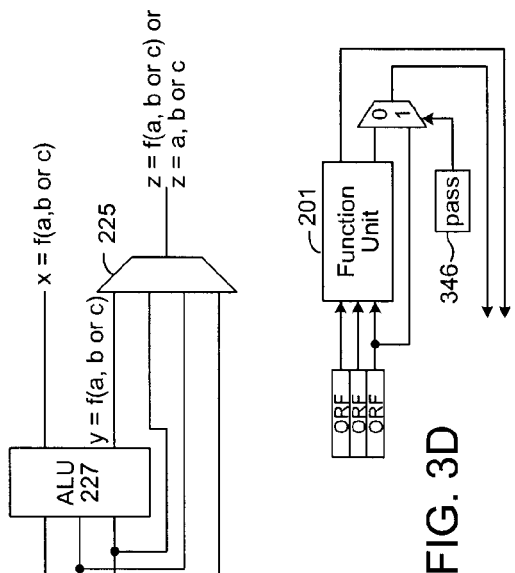
FIG. 3C
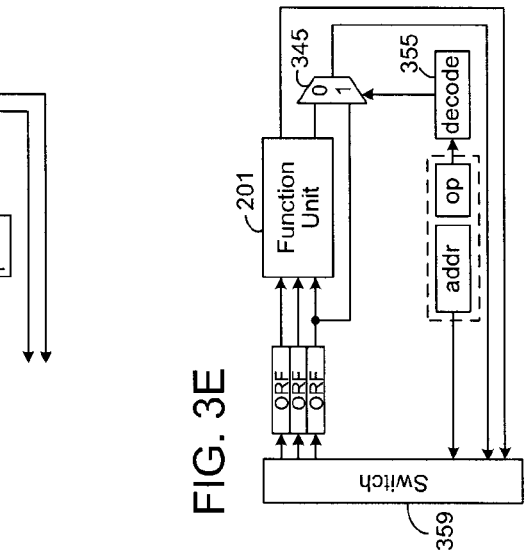
FIG. 3D
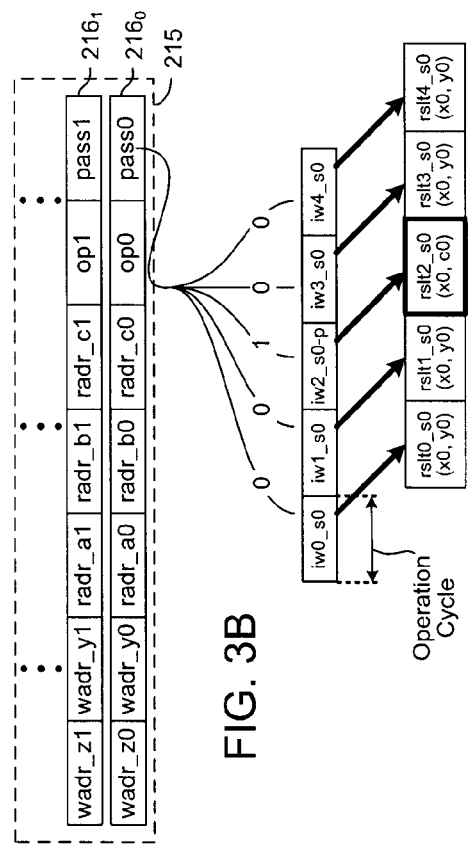
FIG. 3E
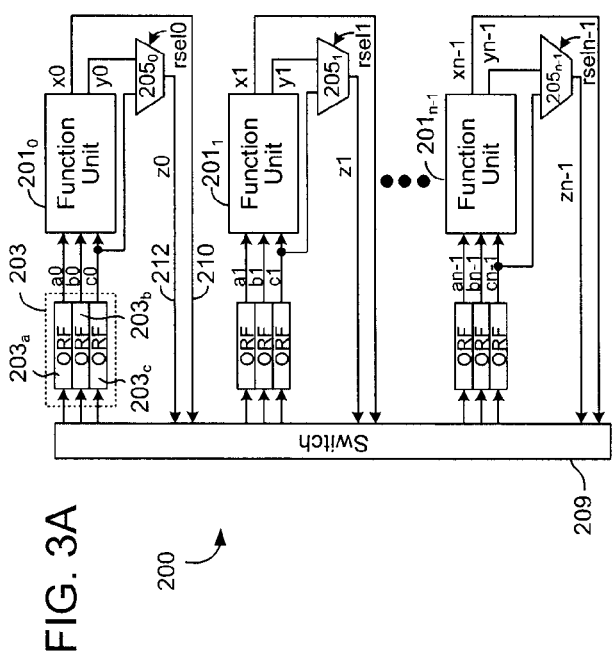
FIG. 3A
FIG. 3B

INSTRUCTION-PARALLEL PROCESSOR WITH ZERO-PERFORMANCE-OVERHEAD OPERAND COPY

CROSS-REFERENCE TO RELATED APPLICATIONS

This application claims priority to U.S. Provisional Patent Application No. 60/849,945, filed Oct. 6, 2006, entitled SYSTEM AND METHOD FOR EFFICIENT EXECUTION OF COMPOUND VECTOR OPERATIONS IN A PROGRAMMABLE PROCESSOR.

TECHNICAL FIELD

The disclosure herein relates to data processing.

BACKGROUND

A number of modern processor architectures, including superscalar processors and very-long-instruction-word (VLIW) processors, exploit instruction-level-parallelism within a processing task by executing multiple instructions concurrently, thus multiplying execution throughput relative to conventional scalar (sequential-execution) processors. Superscalar processors typically include dedicated hardware to dynamically determine data dependencies and schedule parallel execution accordingly. By contrast, VLIW processors generally rely on static, compile-time determination of such data dependencies and corresponding instruction parallelism, and thus trade increased compiler complexity for architectural simplicity and efficiency. As it turns out, VLIW architectures are extremely well suited to processing the high-bandwidth streams of data that pervade modern computing and consumer electronics applications.

FIG. 1A illustrates a prior-art VLIW processor architecture 100, including multiple function units $100_1$-$100_3$ coupled to a shared operand register file 103(ORF). As shown in FIG. 1B, a VLIW instruction 115 typically specifies explicitly the operation (i.e., in operation codes op1, op2, op3) to be performed in parallel by each function unit 101 (this is in contrast to superscalar designs in which allocation of operations to individual function units is determined during program runtime and generally hidden from compiler/programmer view) as well as the register-file addresses of operands (radr0-radr2) and the operation outputs (wadr0, wadr1). The operation set of register file addresses and operation code provided to each execution unit is referred to as a slot or instruction slot within the overall VLIW instruction. In the VLIW instruction 115, for example, instruction slots $116_1$-$116_3$ are provided to function units $101_1$-$101_3$, respectively during a given execution cycle (also referred to herein as an operation cycle). In each execution cycle, each function unit 101 receives a set of operands 102 from the shared register file 103, performs instructed operations thereon, and outputs operation results 104 (although result output may be latent by a number of execution cycles as shown in FIG. 1B, according to the depth of the execution pipeline), all in accordance with the read addresses, operation code and write addresses provided in the instruction slot for that function unit. To accommodate this parallel operation, the shared operand register file 103 must generally be multi-ported, having a separate access port for each operand to be retrieved and each result to be written back. In practice, the need for multiple access ports per function unit results in quadratic growth of the operand register file 103 as the number of function units 101 is increased (each new port into the register file 103 typically requires an additional set of word lines, bit lines and access transistors to access the storage cells of the selected register, and the storage elements themselves, commonly implemented by inverter-based latch elements, also must usually grow to accommodate the additional output loading), thus limiting the number of function units 101 that can practicably be supported.

To counter scalability limitations inherent in the shared register file approach, distributed register file architectures, such as the architecture 120 shown in FIG. 2A, have been developed. In a distributed register file architecture, the shared register file is, in effect, decomposed into multiple smaller operand register files $125_1$-$125_3$, each of which is distributed among, and dedicated to supplying operands 124 to, a respective one of function units $123_1$-$123_3$. A switch circuit 127 (i.e., cross-bar switch or other switch fabric) is provided to enable operation results 126 from each of the function units 123 to be stored in any of the distributed register files 125.

The scalability achieved in the distributed register file architecture 120 comes at the cost of increased data access overhead for the individual function units 123. More specifically, if an operand needed by a given function unit is stored in a remote register file 125 instead of the local, directly-connected register file (a condition which may arise due to resource conflict in accessing a given register file, necessitating storage of the operation result temporarily in a different register file), an execution cycle typically must be wasted within the remote function unit (i.e., the function unit directly connected to receive operands from the remote register file) to copy the operand via switch 127 to the local register file, an operation referred to herein as a register-to-register copy. Thus, the increased scalability of the distributed register file architecture comes at the cost of performance penalty as execution intervals (operation cycles) are occasionally consumed in performing register-to-register copy operations. FIGS. 1B and 2B illustrate this performance tradeoff in terms of instruction execution sequences for the shared register file architecture of FIG. 1A and the distributed register file architecture of FIG. 2A, respectively. As shown, instruction slots iw0_s1-iw4_s1 (i.e., instruction slots directed to function unit $101_1$) may be executed in sequence (in respective operation cycles as shown) and without interruption in the shared-register-file architecture of FIG. 1A (producing corresponding results rslt0_s1-rslt4_s1 some time later, according to pipeline depth within the function units 101), while that same instruction word execution sequence must be interrupted in the distributed register file architecture 120 to perform a register-to-register copy ("r2r"), the copy operation consuming an operation cycle to produce an operand needed by one of the function units at the output of another (i.e., at the output of the function unit coupled to the register file containing the desired operand) and to write the needed operand write back to the appropriate register file.

Referring again to FIG. 2A, the tradeoff between performance and register file size may be extended even further in a fully-distributed register file architecture in which each of the distributed register files 125 is further decomposed into a set of even smaller dual-ported register files $131_1$-$131_3$, with each dual-ported register file 131 dedicated to a respective operand input of a particular function unit 123 and having additional switching circuitry 133 to access an address-selected one of the register files 131 and an address-selected one of registers $135_0$-$135_{N-1}$ within the selected register file 131. While the fully-distributed register file architecture tremendously simplifies the register file implementation and saves precious die area that may be re-allocated to implementation of additional function units and associated register files, the register-to-register copy overhead becomes substantial, with such operations consuming up to 20% or more of the execution pipeline in some applications.

BRIEF DESCRIPTION OF THE DRAWINGS

The disclosure herein is illustrated by way of example, and not by way of limitation, in the figures of the accompanying drawings and in which like reference numerals refer to similar elements and in which:

FIGS. 1A and 1B illustrate a prior-art shared-register-file VLIW processor and corresponding instruction execution sequence;

FIGS. 2A and 2B illustrate a prior-art distributed-register-file VLIW processor and corresponding instruction execution sequence;

FIG. 3A illustrates an embodiment of a VLIW processor capable of performing a zero-overhead operand copy function and having multiple function units, a fully-distributed set of register files, result-path multiplexers and switching circuitry;

FIG. 3B illustrates an exemplary instruction execution sequence within a given function unit of FIG. 3A;

FIG. 3C illustrates a more generalized selection circuit (selector circuit) that may be used within the embodiment of FIG. 3A;

FIG. 3D illustrates control of the result-path multiplexer of FIG. 3A using a dedicated pass-control bit provided within or in association with an incoming instruction;

FIG. 3E illustrates control of the result-path multiplexer of FIG. 3A using a decoder to detect encoded pass-control information provided in an incoming instruction.

DETAILED DESCRIPTION

Figure 4:
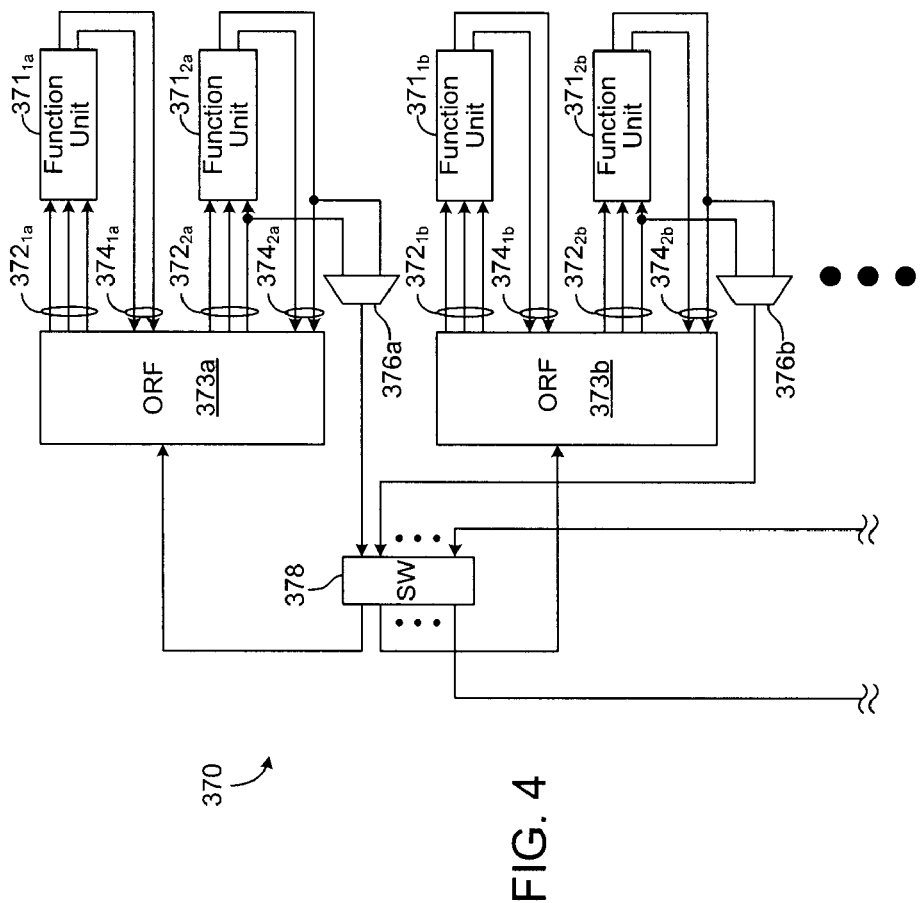
FIG. 4 illustrates an alternative embodiment of a VLIW processor.

A distributed-register-file processor having circuitry to effect a register-to-register copy concurrently with execution of an instruction is disclosed in various embodiments herein. In one embodiment, the register-to-register copy operation, referred to herein as a pass operation, is carried out concurrently with execution of a partial-result instruction; an instruction that produces a result on less than all the outputs of a given function unit. In a particular implementation, for example, a multiplexer or other selector circuit is provided to select either the address-selected content of an operand register file, or the output of the function unit to be output on (passed to) one of multiple result paths associated with the function unit. By this arrangement, if the result path is not needed to convey an operation result (i.e., a result generated by the function unit as a result of instruction/operand processing), the result path may be used to transfer the content of the address-selected register to the switching circuitry for the distributed register files and thus to an address-selected register within another of the distributed register files, thereby effecting a pass operation. Because the pass operation may be carried out concurrently with execution of a partial-result instruction (which instruction may be a necessary and natural part of program execution), a register-to-register copy may be performed without interrupting the instruction execution sequence and thus, from the standpoint of instruction processing bandwidth, with zero overhead. In one embodiment, a pass-control bit is provided within each instruction slot and provided to the result-path multiplexer to control the selection between function unit output (i.e., operational result) and register-file operand. In another embodiment, the selection between operational result and register-file operand is encoded within the operation code of the operand instead of signaled by a dedicated pass-control bit. In yet another embodiment, a pass operation is performed (i.e., operand register file selected to drive result path) whenever a partial-result instruction is detected, with the pass-control bit or operation code (or result write address) being used to control whether the value passed to the multiplexed result path is written back to a register file. These and other embodiments are described in further detail below. Operand write back may alternatively be carried out in every partial-result instruction, with compiler control over whether a pass operation is to be carried out through specification of either a write-back address in a remote register file (including another fully distributed register file coupled to a different input of the same function unit as the register file that sourced the passed operand), or a write-back address that matches the address from which the operand was retrieved (thus effecting a no-change operation).

FIG. 3A illustrates an embodiment of a VLIW processor 200, or portion thereof, capable of performing a zero-overhead operand copy function and having multiple function units $201_0$-$201_{n-1}$ (also referred to herein as execution units), a fully-distributed set of register files 203a-203c (per function unit), result-path multiplexers $205_0$-$205_{n-1}$ and switching circuitry 209. In the particular implementation shown, each function unit 201 receives three operands (a, b, c, with the "0, 1, ... n-1" designation indicating the corresponding function unit $201_0$-$201_{n-1}$), each from a respective operand register file (203a, 203b, 203c), and generates as many as two operation results (x, y) at respective outputs. The specific numbers of inputs and outputs are illustrated in FIG. 3A and other embodiments herein for purposes of example only. More or fewer operands and/or operation results may be provided in alternative embodiments. Also, while a architecture having a fully-distributed register file set is shown, the operand copy function and associated circuitry and methodology may also be applied within a partially distributed processor architecture.

Referring to the outputs associated with function unit $201_0$ (the other function units $201_1$-$201_{n-1}$ have the same number of inputs/outputs as function unit $201_0$ and are constructed in the same manner, though this need not be so), a dedicated result path 210 is coupled directly to the 'x' function unit output to convey the corresponding operation result (x) directly back to the switching circuit 209, while the other result path 212 is coupled via result-path multiplexer $205_0$, to receive, as output z, either the second function unit output (y) or the address-selected operand within register file 203c (i.e., operand c). By this operation, depending on the state of a result-select signal, $rsel_0$, result path 212 may convey to switch circuit 209 either an operand (c) as part of an operand pass operation (also referred to herein as a register-to-register copy or transfer operation), or the result of an instruction execution. The switch circuit 209 responds to respective write address values associated with result paths 210 and 212 to write the values received back to address-selected register files within the VLIW processor 200. Thus, in the case of an operand pass operation, operand c from register file 203c is supplied to the switch circuit concurrently with an operation result (x) from the function unit, and both the operation result and the passed operand are recorded at address-selected locations within the distributed register files. The switching circuit 209 itself may be implemented by any suitable switch fabric including, for example and without limitation, a full cross-bar switch, or partial cross-bar switch (i.e., switching circuits in which any input may be coupled to any output, or more limited switching circuits in which one or more of the inputs may be connected to only a limited set of outputs).

FIG. 3B illustrates an exemplary instruction word 215 provided to the VLIW processor 200 of FIG. 3A, and an exemplary instruction execution sequence within function unit $201_0$ of FIG. 3A. In the embodiment shown, the instruction word 215 includes a separate instruction slot ($216_0$, $216_1$, etc.) for each function unit, with each instruction slot 216 including an operation code (op), pass-control bit (pass), addresses of operands to be supplied to the function unit (radr0-radr2) and operated on in accordance with the operation code, and write addresses (wadr0 and wadr1) that specify the destination register files and registers therein at which values driven onto result paths 210 and 212 are to be stored. In the exemplary instruction execution sequence, a sequence of results (rslt0-rslt4) produced in response to execution of instructions iw0_s0-iw4_s0 (i.e., instruction slots delivered to function unit $201_0$) may be delayed by one or more execution cycles relative to start of instruction execution (also referred to herein as operation cycles) according to the number of pipeline stages required for instruction execution to be completed, and the time associated with each, a delay referred to herein as result latency. Thus, even though an operation result may be output onto one or both of the result paths 210, 212 in each execution cycle, the function unit output during a given operation cycle may have resulted from an instruction execution begun in an earlier operation cycle. Further, the result latency may vary between function units, or even over time within a given function unit, depending, for example, on the nature of the instructions being executed. Also, it should be noted that an instruction execution sequence for only one of the n function units 201 is shown; n-1 other instruction execution sequences are carried out in parallel within the other function units.

In the exemplary instruction sequence of FIG. 3B, the state of the pass-control bit is deasserted (e.g., logic '0') within each instruction slot except for instruction slot, iw2, as indicated by the notation "iw2-p" and the logic '1' pass-control bit shown in association with that instruction. Consequently, the result-select signal is set to a first state (e.g., logic '0') to select the 'y' output of the function unit 201 to be forwarded to the switching circuit 209 as part of all instruction execution results (rslt0, rslt1, rslt3 and rslt4) except the instruction execution result for iw2 (i.e., rslt2). Instead, during the output of instruction result, rslt2, only the primary function unit output, 'x', is provided to the switching circuit 209, and the result-path multiplexer 205 is switched to pass the operand (c) from operand register file 203c to the switching circuit 209 instead of the secondary function unit output, 'y'. In practice, the VLIW compiler may identify partial-result instructions (i.e., instructions which drive operation result information on only a portion of the function-unit outputs as opposed to full-result instructions which, when executed, cause the function unit to drive all function unit outputs) and associate pass operations therewith. In general, the compiler may attach (associate) a pass operation to any partial-result instruction that will result in delivery of the operand to the register file for the requisitioning function unit (i.e., the function unit in which the operand is needed) in time for use in program execution. Thus, the compiler may evaluate the sequence of instructions to be executed within each function unit 201 to identify partial-result instructions and tag such instructions as candidates for attaching operand pass operations (i.e., setting the pass-control bit or otherwise signaling a pass operation is to be performed concurrently with instruction execution). In the case of the three-input, two-output function units 201 shown in FIG. 3A, examples of full-result instructions may include multiply and accumulate instructions which convey the multiply-accumulate result in the primary output (x), and a carry value in the secondary output (y), (and also dot-product and add instructions, byte shuffling instructions, unpack instructions and so forth), while partial-result instructions may include carry-less multiply instructions, carry-less add instructions, subtract instructions, shift instructions, Boolean operations, and so forth. More generally, any instructions that do not require both function unit outputs to convey operation results, may be associated with corresponding pass operations, thus enabling two (or more) independent outputs to be driven concurrently on the result paths 210 and 212 (operation result and passed operand) and forwarded to the switching circuit 209. Thus, the operation of the function unit and result-selector (result-path multiplexer) may be collectively expressed as:

$x = f(a, b \text{ and/or } c)$, and $z = c$ or $y$, where $f( )$ denotes an arithmetic or logical operation; a, b and c are the input operands; and x and z are the values driven onto paths 210 and 212, respectively.

Note also that while a dedicated register file 203c is coupled to the result-path multiplexer 205 in the embodiment of FIG. 3A, a more generalized selection circuit may be provided as shown in FIG. 3C. That is, a result-path multiplexer 225 may have additional input ports coupled to receive operands a and b, as well as c, and also the output of the function unit (modeled as an arithmetic logic unit 227, ALU, in the embodiment of FIG. 3C). Thus, in this arrangement, the primary and secondary outputs of the function unit are functions of operands a, b and/or c, and the output of the result-path multiplexer (z) is therefore either a function of operands a, b and/or c, or, in the case of a pass operation, z=a, b or c. Also, while single operand pass architecture is shown in FIGS. 3A and 3C, if the function units or any one or more thereof include additional outputs, more than one pass operation may be performed in a given operation cycle (i.e., an operation result may be forwarded to the switching circuit together with two or more passed operands).

With respect to control of the result-path multiplexer in FIGS. 3A and 3C, a dedicated pass-control bit 346 may be provided with each instruction slot as shown in FIG. 3B, and supplied to the control input (i.e., select input) of result-path multiplexer 345 as shown in FIG. 3D, or the pass-control function may be encoded within the instruction operation code. For example, as shown in FIG. 3E, a decoder 355 may be provided to detect one or more operation codes (op) that indicate pass operations are to be performed. More specifically, assuming that m bits are used to encode less than $2^m$ instructions, one or more of the unused codes may be used to specify pass operations. Alternatively, the decoder may simply detect the presence of all partial-result instructions and enable an operand pass onto the otherwise unused result path in response. In that case, signals provided to switch 359 may control whether the write address (addr) associated with the multiplexed result path is to be applied in a write-back operation.

Referring again to FIGS. 3A and 3B, it should be noted that in those embodiments an other embodiments described herein, instead of providing a dedicated write address in association with each of result paths 210 and 212 for a given function unit, one or more write addresses may be associated instead with individual operand register files. For example, in one embodiment, each operand register file 203a, 203b, 203c includes a single write port, and the collection of write addresses supplied within an instruction word may be associated individually with respective operand register files.

FIG. 4 illustrates an alternative embodiment of a VLIW processor 370 in which each operand register file (373a, 373b, etc.) is shared among a subset of function units. In the specific embodiment shown, for example, each operand register file 373 is shared among two function units, with register file 373a supplying operands ($372_{1a}$, $372_{2a}$) to, and receiving results ($374_{1a}$, $374_{2a}$) from function units $371_{1a}$ and $371_{2a}$; register file 373b supplying operands ($372_{1b}$, $372_{2b}$) to, and receiving results ($374_{2a}$, $374_{2b}$) from function units $371_{1b}$ and $371_{2b}$, and so forth.

In the particular embodiment shown, one of the function units associated with each operand register file 373 is capable of performing an operand pass function in response to an pass-control bit (or encoded instruction). More specifically, a multiplexer 376a is coupled to receive one of the operation results from function unit $371_{2a}$, and at least one of the operands $372_{2a}$, and forwards the selected value (operand or operation result) to a switching circuit 378 for storage within an address-selected one of the operand register files 373. By this arrangement, whenever a partial-result instruction is being executed within function unit $371_{2a}$, an operand pass function may be carried out by switching multiplexer 376a to forward one of the operands $372_{2a}$ from operand register file 373a to another of the operand register files 373 via switching circuit 378. Multiplexer 376b is similarly connected to receive the output of function unit $371_{2b}$ and at least one of operands $372_{2b}$ from operand register file 373b and thus may switchably select either the operation result or operand to be supplied, via switch 378, to an address-selected one of the operand register files.

Still referring to FIG. 4, it should be noted that, in alternative embodiments, more than two function units may share the same operand register file 373. Also, within a given shared operand register file, each of the associated function units, or at least more than one of the function units, may include or be coupled to circuitry for performing an operand-pass function. Further, more than one of the operands supplied to a given function unit may be provided to inputs of a multiplexer 376, and thus selected as the source of an operand in an operand-pass function.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A processor comprising:
a plurality of execution units with more than one output port to execute instructions in parallel
where some of the supported instructions produce results on all of the output ports and some of the instructions produce results only on a subset of the output ports;
a plurality of register files each associated with one or more of the execution units; and
selection circuitry to select an instruction execution result from a first one of the execution units when an instruction on the first one of the execution units produces results on all of the output ports associated with the first one of the execution units or to select the content of a register within a first one of the register files associated with the first one of the execution units to be stored within a register within a second one of the register files when an instruction on the first one of the execution unit produces results only on a subset of the output ports associated with the first one of the execution units.

2. The processor of claim 1 wherein the plurality of register files comprise a plurality of sets of register files, each set of register files being associated with a respective one of the execution units and including individual register files each coupled to a respective operand input of the associated one of the execution units.

3. The processor of claim 2 wherein the selection circuitry comprises a multiplexer having a first input coupled to at least one of the individual register files and a second input coupled to an output of the first one of the execution units.

4. The processor of claim 1 wherein each register file of the plurality of register files is coupled to a subset of two or more of the function units.

5. The processor of claim 1 further comprising a switching circuit coupled to the selection circuitry to receive therefrom either the instruction execution result or the content of the register as a selected output, the switching circuit including circuitry to store the selected output in the register within the second one of the register files.

6. The processor of claim 5 wherein the switching circuit comprises a cross-bar switch.

7. The processor of claim 1 wherein the plurality of execution units are coupled to receive respective sequences of instructions, each execution unit including circuitry to begin execution of individual instructions one after another in respective execution intervals.

8. The processor of claim 7 wherein the first one of the execution units includes circuitry to output the instruction execution result to the selection circuitry during a fist one of the execution intervals and concurrently output of the content of the register to the selection circuitry.

9. The processor of claim 1 wherein the first one of the execution units includes at least two outputs to concurrently convey execution results and wherein less than all the outputs are used to convey execution results upon execution of particular types of instructions.

10. The processor of claim 9 wherein the selection circuitry comprises a multiplexer coupled to at least one of the outputs of the first one of the execution units and to the first one of the register files.

11. The processor of claim 10 further comprising an instruction register to hold an instruction word that specifies an operation to be performed within the first one of the execution units, the instruction word including information that indicates whether the selection circuitry is to select the instruction execution result or the content of the register within the first one of the register files to be stored within the register within the second one of the register files.

12. The processor of claim 11 wherein a dedicated bit within the instruction word is provided to the selection circuitry to indicate whether the selection circuitry is to select the instruction execution result or the content of the register.

13. The processor of claim 11 further comprising a decoder circuit coupled to receive the instruction word from the instruction register and to decode the instruction word, the decoder circuit including circuitry to generate a select signal, according to the decoding of the instruction word, that indicates whether the selection circuitry is to select the instruction execution result or the content of the register.

14. The processor of claim 1 wherein the processor is a very-long-instruction-word (VLIW) processor.

15. A method of operation within an integrated circuit device, the method comprising:
executing instructions in parallel within a plurality of execution units with more than one output port, including receiving operands within the execution units from respective register files, wherein some of the supported instructions produce results on all of the output ports and some of the instructions produce results only on a subset of the output ports; and
selecting either a first instruction execution result from a first one of the execution units when an instruction on the first one of the execution units produces results on all of the output ports associated with the first one of the execution units, or content of a register within a first one of the register files associated with the first one of the execution units to be stored within a register within a second one of the register files when an instruction on the first one of the execution units produces results only on a subset of the output ports associated with the first one of the execution units.

16. The method of claim 15 further comprising providing, via a switching circuit, either the instruction execution result or the content of the register within the first one of the register files to an input of the register within the second one of the register files.

17. The method of claim 16 wherein selecting either an instruction execution result from a first one of the execution units or content of a register within a first one of the register files associated with the first one of the execution units comprises selecting either the instruction execution result or the content of the register according to the state of a bit within an instruction word.

18. The method of claim 16 wherein selecting either an instruction execution result from a first one of the execution units or content of a register within a first one of the register files associated with the first one of the execution units comprises decoding an instruction to generate a decoded result and selecting either the instruction execution result or the content of the register according to the decoded result.

19. The method of claim 15 wherein, if the content of the register is selected to be stored, storing the content within the second one of the register files concurrently with storing a second execution result from the first one of the execution units within the register files.

20. The method of claim 15 wherein the integrated circuit device comprises a very-long-instruction-word (VLIW) processor.

* * * * *

UNITED STATES PATENT AND TRADEMARK OFFICE
CERTIFICATE OF CORRECTION

PATENT NO. : 7,669,041 B2
APPLICATION NO. : 11/742514
DATED : February 23, 2010
INVENTOR(S) : Khailany et al.

It is certified that error appears in the above-identified patent and that said Letters Patent is hereby corrected as shown below:

Title Page; item 54 and Col. 1, lines 1-3;

replace "INSTRUCTION-PARALLEL PROCESSOR WITH ZERO-PERFORMANCE-OVERHEAD OPERAND COPY"

with --PROCESSOR WITH ZERO-OVERHEAD OPERAND COPY--.

Signed and Sealed this
Twelfth Day of July, 2011

David J. Kappos
*Director of the United States Patent and Trademark Office*